US011912100B2

(12) United States Patent
Nicolas et al.

(10) Patent No.: US 11,912,100 B2
(45) Date of Patent: Feb. 27, 2024

(54) THERMAL CONDITIONING CIRCUIT

(71) Applicant: Valeo Systemes Thermiques, Le Mesnil Saint Denis (FR)

(72) Inventors: Bertrand Nicolas, Le Mesnil Saint Denis (FR); Mohamed Yahia, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 668 days.

(21) Appl. No.: 16/959,925

(22) PCT Filed: Jan. 3, 2019

(86) PCT No.: PCT/FR2019/050005
§ 371 (c)(1),
(2) Date: Jul. 29, 2021

(87) PCT Pub. No.: WO2019/135049
PCT Pub. Date: Jul. 11, 2019

(65) Prior Publication Data
US 2023/0191867 A1 Jun. 22, 2023

(30) Foreign Application Priority Data
Jan. 4, 2018 (FR) ...................................... 1850044

(51) Int. Cl.
*B60H 1/00* (2006.01)
(52) U.S. Cl.
CPC ..... *B60H 1/00278* (2013.01); *B60H 1/00885* (2013.01); *B60H 1/00921* (2013.01);
(Continued)

(58) Field of Classification Search
CPC ............ B60H 1/00278; B60H 1/00885; B60H 1/00921; B60H 2001/00307; B60H 2001/00949
(Continued)

(56) References Cited

U.S. PATENT DOCUMENTS

2012/0085114 A1* 4/2012 Graaf ..................... B60H 1/323
62/238.7

FOREIGN PATENT DOCUMENTS

CN 104180556 A 12/2014
DE 102015121185 A1 6/2017
(Continued)

OTHER PUBLICATIONS

International Search Report and Written Opinion corresponding to International Application No. PCT/FR2019/050005, dated Apr. 10, 2019 (13 pages).

*Primary Examiner* — Davis D Hwu
(74) *Attorney, Agent, or Firm* — Osha Bergman Watanabe & Burton LLP

(57) ABSTRACT

The invention relates to a thermal conditioning circuit (1) for a hybrid or electric motor vehicle, in which a refrigerant can circulate, said circuit (1) comprising a compressor (3), a condenser (5), an evaporator-condenser (7), an evaporator (9) and a heat exchanger (11) thermally coupled to an electric member, e.g. a vehicle electric battery, characterized in that the circuit is configured to operate at least in the following three modes in which the refrigerant can circulate in a cascade and successively:—via the condenser (5), the evaporator-condenser (7) and the evaporator (9) in a first mode;—via the condenser (5), the evaporator (9) and the evaporator-condenser (7) in a second mode; and—in another mode, i.e. a third mode, in which the evaporator (9) is arranged in parallel to the heat exchanger (11) and/or to the evaporator-condenser (7) such that the refrigerant can cir-
(Continued)

culate in a cascade and successively via the condenser (5) and then via at least two of said elements (7, 9, 11) that are arranged in parallel.

8 Claims, 2 Drawing Sheets

(52) U.S. Cl.
CPC .............. *B60H 2001/00307* (2013.01); *B60H 2001/00949* (2013.01)

(58) Field of Classification Search
USPC ........................................................ 165/202
See application file for complete search history.

(56) References Cited

FOREIGN PATENT DOCUMENTS

| | | | |
|---|---|---|---|
| EP | 2774787 | A1 | 9/2014 |
| FR | 3025297 | A1 | 3/2016 |
| WO | 2013079342 | A1 | 6/2013 |

\* cited by examiner

THERMAL CONDITIONING CIRCUIT

The present invention relates to a thermal conditioning circuit for a hybrid or electric motor vehicle; more particularly, this type of circuit makes it possible to thermally condition an air flow intended to terminate in the passenger compartment of said vehicle.

Usually in a motor vehicle, the thermal conditioning circuit comprises a plurality of heat exchangers in which a refrigerant circulates.

The changes in state of the refrigerant through the various branches of the circuit, and by way of said heat exchangers, will make it possible to cool and/or heat an air flow passing through one or more exchangers and intended to terminate in the passenger compartment of the motor vehicle.

Generally, said circuit has several operating modes which make it possible, for example, to heat or cool the passenger compartment, or even to dehumidify the air intended for the passenger compartment.

Furthermore, in the context of a hybrid or electric vehicle, it is also necessary to maintain the electric battery (or any electric member) of the vehicle within a predetermined temperature range in order, for example, to preserve its service life. To this end, the thermal conditioning circuit comprises a heat exchanger thermally coupled to an electric member of the vehicle, such as an electric battery of the vehicle, in order to regulate the temperature of said member.

Thus, the present invention aims to propose a new type of thermal conditioning circuit, of a simple design, which makes it possible to ensure the comfort of the users by virtue of a plurality of operating modes to cope with various external temperature and humidity conditions, while allowing thermal conditioning of an electric member of the vehicle.

The present invention is therefore a thermal conditioning circuit for a hybrid or electric motor vehicle, in which a refrigerant is able to circulate, said circuit comprising a compressor, a condenser, an evaporator-condenser, an evaporator and a heat exchanger thermally coupled to an electric member, such as a vehicle electric battery, characterized in that the circuit is configured to operate at least in the following three modes, in which the refrigerant is able to circulate in series and successively:
through the condenser, the evaporator-condenser and the evaporator, called the first mode;
through the condenser, the evaporator and the evaporator-condenser, called the second mode;
as well as in another mode, called the third mode, in which the evaporator is arranged in parallel with the heat exchanger and/or the evaporator-condenser, the refrigerant then being able to circulate in series and successively through the condenser and then through at least two of said elements arranged in parallel.

Thus, the circuit according to the invention makes it possible in the first operating mode to cool the air intended for the passenger compartment, in the second mode to heat the air intended for the passenger compartment and in the third mode to dehumidify the air intended for the passenger compartment and to cool the electric member when said heat exchanger is traversed by the refrigerant.

The third mode makes it possible, by its modularity, to ensure the air dehumidification function according to various outside temperatures and humidity levels, while cooling the member and/or an electric battery of the vehicle when necessary.

According to one possible feature, the evaporator-condenser is arranged on the front face of the vehicle, the evaporator-condenser allowing for example a heat exchange between an air flow, in particular an exterior air flow, passing through said evaporator-condenser and the refrigerant (circulating inside the evaporator-condenser).

Note that the term "exterior" used to describe an air flow indicates that the air flow comes from outside the vehicle.

According to another possible feature, the evaporator is arranged inside a heating, ventilation and/or air conditioning device of the motor vehicle.

A heating, ventilation and/or air conditioning device is a housing, located under the dashboard of the vehicle, which comprises one or more heat exchangers of the thermal conditioning circuit, an air blower, at least one air inlet and air outlets. The device also comprises flaps for managing the air flows inside said device.

According to another possible feature, the thermal conditioning circuit comprises a heat-transfer fluid circuit, such as glycol water, which comprises an electric member and/or an electric battery of the vehicle.

According to another possible feature, said heat exchanger, that is to say the heat exchanger thermally coupled to the electric member, is also connected to a heat-transfer fluid circuit.

The heat exchanger allows heat exchanges between the heat-transfer fluid and the refrigerant.

According to another possible feature, the heat-transfer fluid circuit comprises a pump capable of circulating the heat-transfer fluid in said circuit.

According to another possible feature, the condenser is arranged inside the heating, ventilation and/or air conditioning device of the vehicle.

According to another possible feature, the circuit is configured so that the circuit operates in the following mode, in which the refrigerant is able to circulate in series and successively through the condenser, the heat exchanger and the evaporator-condenser, called the fourth mode.

According to another possible feature, the circuit is configured so that the circuit operates in the following mode, in which the refrigerant is able to circulate in series and successively through the condenser, the evaporator-condenser and the heat exchanger, called the fifth mode.

According to another possible feature, the circuit is configured to allow the reversal of the direction of circulation of the refrigerant in the evaporator-condenser at least between the first and second operating modes of said circuit.

According to another possible feature, said circuit comprises a bidirectional expansion valve which allows the refrigerant passing through it or having passed through the evaporator-condenser to undergo expansion, whether the evaporator-condenser operates as an evaporator or as a condenser.

The bidirectional expansion valve is thus configured to achieve expansion of the refrigerant in the second or fourth operating mode before it circulates in the evaporator-condenser.

The bidirectional expansion valve is also configured to achieve expansion of the refrigerant in certain variants of the third operating mode after the fluid has circulated in the evaporator-condenser.

According to another possible feature, said circuit comprises at least three expansion valves:
a first expansion valve located directly upstream of the evaporator;
a second expansion valve located directly upstream of the heat exchanger;

a third expansion valve located directly upstream of the evaporator-condenser when the latter operates as a condenser.

It will be noted that "directly" means the fact that the refrigerant does not pass through any other intermediate element which can make it undergo a physical transformation (leading to a variation in a physical quantity of the fluid, such as pressure, enthalpy, etc.), the intermediate element being for example an exchanger, expansion valve, etc.

According to another possible feature, the circuit comprises:
- a first branch comprising the compressor and the condenser downstream of the compressor, as well as a valve and a reservoir, the reservoir being arranged upstream of the compressor and the valve being arranged upstream of the reservoir;
- a second branch comprising a valve, the evaporator and the heat exchanger;
- a third branch comprising the evaporator-condenser;
- said first, second and third branches being connected in parallel to one another.

According to another possible feature, the circuit comprises:
- a fourth branch which connects the second branch to the third branch;
- the connection being made on the second branch upstream of the first and second expansion valves and downstream of the valve of the second branch in the direction of the flow of the fluid as shown in the figure, the connection being made on the third branch between the bidirectional expansion valve and the evaporator-condenser;
- a fifth branch comprising a valve which connects the third branch to the first branch, the connection on the third branch being made between the third expansion valve and the evaporator-condenser, the connection on the first branch between the reservoir and the valve of the first branch.

According to another possible feature, the second branch comprises two sub-branches connected in parallel with one another, one comprising the evaporator and the other the heat exchanger.

The invention will be better understood, and other objects, details, features and advantages thereof will appear more clearly during the following description of a particular embodiment of the invention, given solely by way of illustration and in a nonlimiting manner, with reference to the accompanying drawings, in which.

Figure 1:
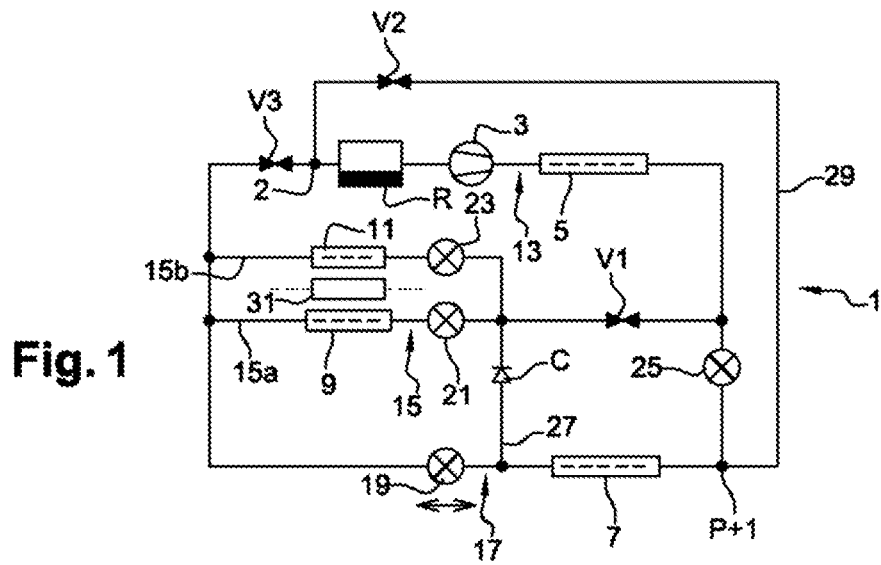
FIG. 1 represents a schematic view of the thermal conditioning circuit.
Figure 2:
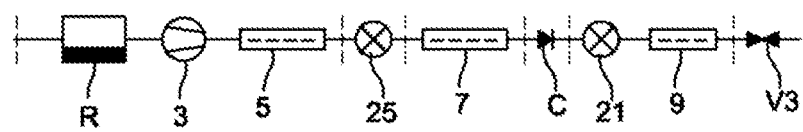
FIG. 2 is a linear schematic representation when the circuit of FIG. 1 operates in a first mode.
Figure 2:
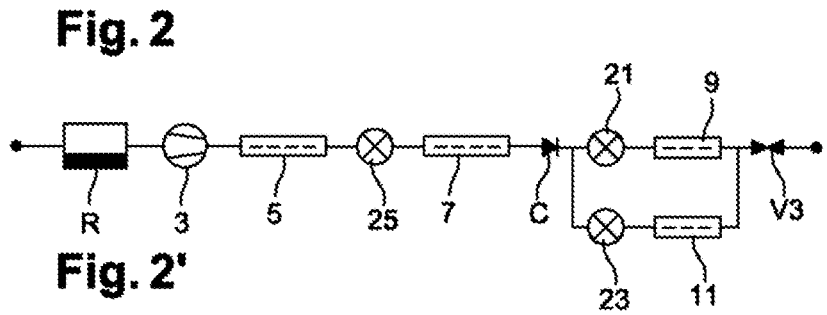
Figure 3:
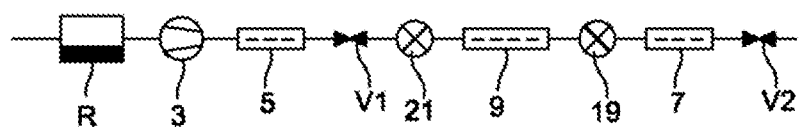
Figure 3:
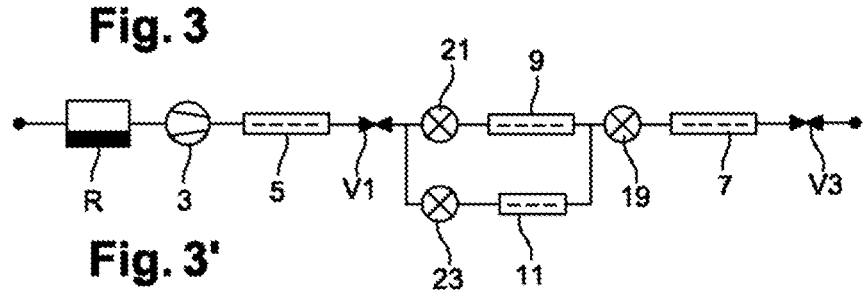
Figure 4A:
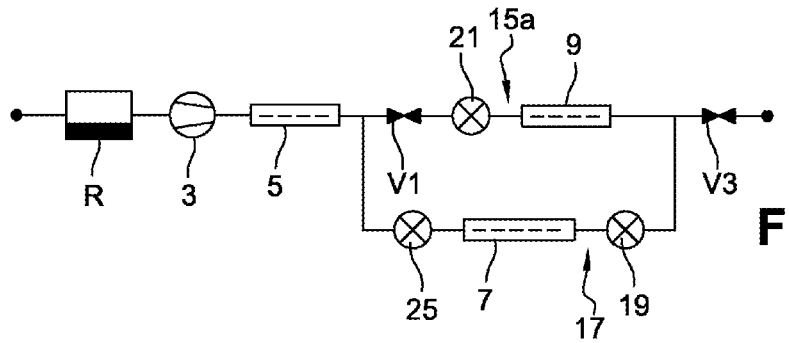
Figure 4B:
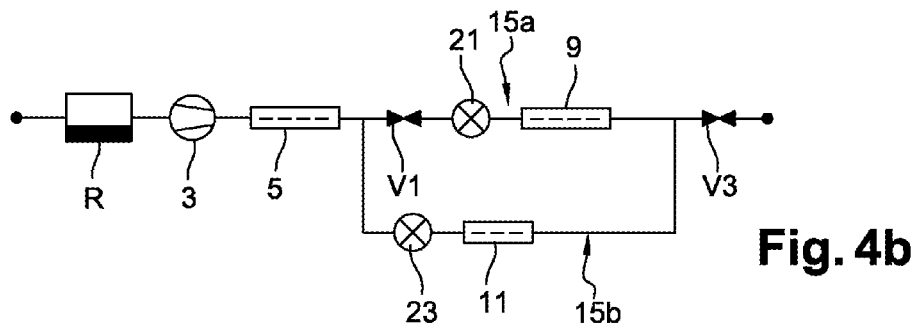
Figure 4C:
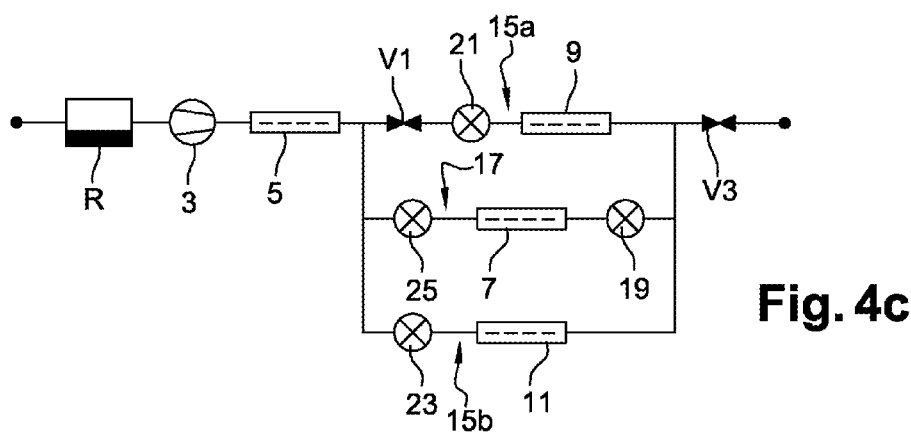
Figure 5:
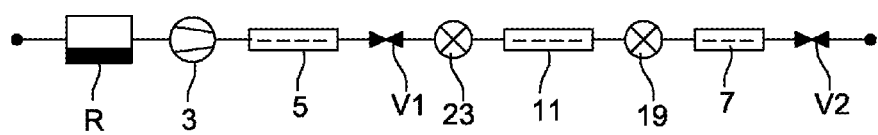
Figure 6:
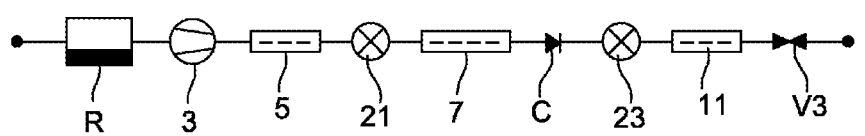

FIG. 2' is a linear schematic representation when the circuit of FIG. 1 operates in a variant of the first mode;

FIG. 3 is a linear schematic representation when the circuit of FIG. 1 operates in a second mode;

FIG. 3' is a linear schematic representation when the circuit of FIG. 1 operates in a variant of the second mode;

FIG. 4a is a linear schematic representation when the circuit of FIG. 1 operates according to a variant of operation of the third mode;

FIG. 4b is a linear schematic representation when the circuit of FIG. 1 operates according to another variant of operation of the third mode;

FIG. 4c is a linear schematic representation when the circuit of FIG. 1 operates according to yet another variant of operation of the third mode;

FIG. 5 is a linear schematic representation when the circuit of FIG. 1 operates in a fourth mode;

FIG. 6 is a linear schematic representation when the circuit of FIG. 1 operates in a fifth mode.

FIG. 1 represents a schematic view of the thermal conditioning circuit 1 for a hybrid or electric motor vehicle.

The circuit 1 comprises a plurality of heat exchangers, in particular a compressor 3, a condenser 5, an evaporator 9, an evaporator-condenser 7 and a heat exchanger 11 thermally coupled to an electric battery of said vehicle. Note, however, that said heat exchanger 11 can be thermally coupled to any electric member of the vehicle needing to be thermally conditioned.

The circuit 1 also comprises branches connecting its various elements to one another, so that a refrigerant is able to circulate in said circuit 1 along defined paths.

Note for example that:
the evaporator-condenser 7 can be arranged on the front face of the vehicle, the evaporator-condenser being able to be traversed by an air flow (for example an exterior air flow). The evaporator-condenser allows a heat exchange between an air flow passing through said evaporator-condenser and the refrigerant circulating inside the evaporator-condenser. The air flow passing through said evaporator-condenser is for example an exterior air flow.

The evaporator 9 is arranged inside a heating, ventilation and/or air conditioning device of the motor vehicle. The evaporator allows a heat exchange between an air flow passing through said evaporator and the refrigerant circulating inside said evaporator. More particularly, the main function of the evaporator is to cool an air flow intended to terminate in the passenger compartment.

The condenser 5 can be arranged inside a heating, ventilation and/or air conditioning device of the motor vehicle, this condenser then being a refrigerant/air condenser generally called an interior, internal or air condenser. The condenser can also be a refrigerant/heat-transfer fluid condenser, that is to say a condenser which thermally couples the circuit 1 to another circuit in which there circulates a heat-transfer fluid, such as glycol water. This type of condenser is generally called a water condenser.

In a variant embodiment of the invention that is not shown, the conditioning circuit comprises an air condenser and a water condenser thermally coupled to the cooling circuit of the electric motor of the vehicle. Said air and water condensers are then placed in series, the refrigerant being able to pass successively through the water condenser, and then the air condenser.

Note that a heating, ventilation and/or air conditioning device is a housing located under the dashboard of the vehicle. This device comprises one or more heat exchangers which have the function of thermally conditioning the air flow intended for the passenger compartment, as well as at least one air inlet and at least one air outlet opening into the passenger compartment. The device can also comprise an air blower, in order to generate an air flow between said at least one air inlet and outlet.

The heat exchanger 11, that is to say the heat exchanger thermally coupled to an electric member or to a battery, has the function of thermally conditioning the electric member or the battery, that is to say to heat or cool it as needed, so that the battery or the electric member remains at an adequate temperature to preserve its service life and efficiency.

The battery exchanger also allows heat exchanges between the heat-transfer fluid and the refrigerant; these heat exchanges can be direct or indirect.

Thus, in another variant embodiment of the invention that is not shown, in the context of an indirect exchange, the circuit 1 comprises a heat-transfer fluid circuit, such as glycol water, comprising the battery, a pump and the exchanger 11, said exchanger 11 therefore being thermally coupled to the battery and/or an electric member via the heat-transfer fluid circuit.

More particularly, the thermal conditioning circuit 1 is configured to operate in various modes which will be detailed below.

Thus, said circuit 1 comprises:
- a first branch 13 comprising the compressor 3 and the condenser 5 arranged downstream of the compressor 3;
- a second branch 15 comprising the evaporator 9 and the heat exchanger 11 thermally coupled to an electric member;
- a third branch 17 comprising the evaporator-condenser 7;
  said first 13, second 15 and third 17 branches being connected in parallel with one another.

It will be noted that the terms "upstream" and "downstream" will be used to facilitate the description of the invention, this the branches and exchangers in which the direction of circulation of fluid does not change this whatever the operating mode of said circuit 1.

Thus, the first branch 13 comprises a reservoir R placed directly upstream of the compressor 3, itself upstream of the condenser 5. The term "directly" should be interpreted as the fact that there is no intermediate element between two sub-elements constituting said circuit. The first branch 13 also comprises a valve V3 located upstream of the reservoir R.

The second branch 15 comprises two sub-branches 15a and 15b connected in parallel with one another, one comprising the evaporator 9 and the other the heat exchanger 11. The first sub-branch 15a comprises the evaporator 9 and the second sub-branch 15b comprises the heat exchanger 11. The second branch 15 also comprises a valve V1 located upstream of the first and second expansion valves 21 and 23.

The outlet 5a of the condenser is thus connected to the second 15 and third 17 branches of the circuit via a fourth branch 19, called the connecting branch.

In addition, said circuit 1 comprises at least three expansion valves:
- a first expansion valve 21 located directly upstream of the evaporator 9;
- a second expansion valve 23 located directly upstream of the heat exchanger 11;
- a third expansion valve 25 located directly upstream of the evaporator-condenser 7 when the latter operates as a condenser.

The circuit also comprises:
- a fourth branch 27 which connects the second branch 15 to the third branch 17, the connection being made on the second branch 15 upstream of the first and second expansion valves, respectively 21 and 23, and downstream of the valve V1 of the second branch 15 in the direction of flow of the fluid, the connection being made on the third branch 17 between the bidirectional expansion valve 19 and the evaporator-condenser 7;
- a fifth branch 29 comprising a valve V2 which connects the third branch 17 to the first branch 13, the connection on the third branch 17 being made between the third expansion valve 25 and the evaporator-condenser 7, the connection on the first branch being made between the reservoir R and the valve V3 of the first branch 13.

Furthermore, the fourth branch 27 comprises a nonreturn valve C, the latter allowing the refrigerant to flow back to the evaporator-condenser 7 in certain operating modes.

FIG. 2 is therefore a linear schematic representation of the thermal conditioning circuit 1 when said circuit 1 operates in a first operating mode.

This first mode makes it possible in particular to cool the air intended for the passenger compartment of the vehicle by means of the evaporator, for example located in the heating, ventilation and/or air conditioning device (not shown).

Thus, in this first mode, the refrigerant is able to circulate successively in the condenser, the evaporator-condenser and then in the evaporator.

The refrigerant is therefore compressed by the compressor 3; at the outlet of the compressor 3, the refrigerant is in a high-pressure gaseous state, then undergoes condensation carried out successively by the condenser 5 and the evaporator-condenser 7 (thus operating as a condenser). The refrigerant at the outlet of the evaporator-condenser is then in a state if possible liquid and sub-cooled at high pressure, and will undergo expansion carried out by a first expansion valve 21, the fluid then being expanded at low pressure before circulating through the evaporator 9.

The air flow intended for the passenger compartment and passing through the evaporator 9 then gives up calories (or heat) to the refrigerant, heating the latter and allowing the cooling of the air flow intended to lead into the passenger compartment.

It will also be noted that the evaporator-condenser 7 must be traversed by an air flow, an exterior air flow in this case, to allow the condensation of the refrigerant passing through it.

In addition, in the first operating mode, the third expansion valve 25 located upstream of the evaporator-condenser 7 is completely open.

This first operating mode can also be used for dehumidifying the air intended to lead into the passenger compartment. The air is dried by first cooling it by the evaporator 9, then heating it via the condenser 5.

In certain situations where there is an excess of power supplied by the compressor 3, the evaporator-condenser 7 completes the condensation of the refrigerant fluid coming from the condenser 5.

A variant of this first operating mode is shown in FIG. 2'; more particularly in this variant, the second expansion valve 23 allows the fluid to circulate in the heat exchanger 11. Thus, the air flow intended to lead into the passenger compartment can be cooled or dehumidified while cooling the vehicle battery via the heat exchanger 11.

Thus, in this variant of the first mode, the refrigerant is able to circulate successively in the condenser 5, the evaporator-condenser 7 and then in the evaporator 9 and the heat exchanger 11 which are arranged in parallel with respect one another.

It will thus be noted that:
- the second expansion valve 23 acts as a valve when the circuit 1 operates in the first mode and as an expansion valve in the variant of the first mode;
- the evaporator 9 and the heat exchanger 11 operate at substantially equivalent pressure levels;
- the first and third expansion valves respectively placed upstream of the evaporator 9 and the heat exchanger 11 also make it possible to regulate (or distribute) the flow of refrigerant fluid in each of the exchangers in order to meet the specific needs of each of these elements.

FIG. 3 is therefore a linear schematic representation of the thermal conditioning circuit 1 when said circuit 1 operates in a second operating mode.

This second mode makes it possible in particular to heat the air intended for the passenger compartment of the vehicle by means of the evaporator 9 and the condenser 5.

Thus, in this second mode, the refrigerant is able to circulate successively in the condenser 5, the evaporator 9 and then in the evaporator-condenser 7.

The refrigerant is therefore compressed by the compressor 3; at the outlet of the compressor 3, the refrigerant is in a high-pressure gaseous state, passes through the condenser 5 and then circulates successively through the evaporator 9 and the evaporator-condenser 7 (operating as an evaporator).

More particularly, the refrigerant leaving the condenser 5 optionally undergoes expansion by the first expansion valve 21, which may then be partially or completely open, in order to bring the refrigerant into an intermediate pressure state before circulating in the evaporator 9. This makes it possible to control the pressure of the refrigerant fluid so as not to exceed the maximum pressure admissible by the evaporator 9. The air flow intended for the passenger compartment is thus heated by the successive passage through the evaporator 9 and the condenser 5.

At the outlet of the evaporator 9, the refrigerant which has been cooled by the air passing through the evaporator undergoes expansion by the bidirectional expansion valve 19, which generally brings it into a state of liquid-vapor mixture at low pressure before it circulates in the evaporator-condenser 7. Said evaporator-condenser 7 (therefore operating as an evaporator), through which an exterior air flow passes, allows the refrigerant to evaporate (the air flow giving off calories to said fluid). Thus, at the outlet of the evaporator-condenser 7, the fluid is in the state close to "gas saturation" at low pressure before it is again compressed by the compressor 3.

This second mode is preferably used for an exterior (or ambient) temperature below −5° C., but also operates for exterior temperatures between −5° C. and 20° C.

Furthermore, if the exterior temperature is between 2 and 5° C., the evaporator 9 preferably operates then in evaporator mode, the refrigerant then undergoing two evaporations in series, carried out respectively by the evaporator 9 and the evaporator-condenser 7.

This also makes it possible, in certain operating modes of the heating, ventilation and/or air conditioning device (more particularly when the air flow intended for the passenger compartment comes at least in part from the passenger compartment itself and not only from the outside), to recover heat from the air coming from the passenger compartment and to recover heat from the ambient (or exterior) air; this has the consequence of limiting the risks of icing of the evaporator-condenser 7.

A variant of this second operating mode is shown in FIG. 3'; more particularly in this variant, the second expansion valve 23 allows the fluid to circulate in the heat exchanger 11.

Thus, it is possible to heat the air flow intended to lead into the passenger compartment while heating or cooling the battery (or an electric member of the vehicle) of the vehicle via the heat exchanger 11.

Specifically, the refrigerant can heat the battery (or an electric member of the vehicle) when it has a temperature below 10° C.

Thus, in this variant of the first mode, the refrigerant is able to circulate successively in the condenser 5, the evaporator 9 and the heat exchanger 11 which are arranged in parallel with respect to one another, and thereafter in the evaporator-condenser 7.

It will thus be noted that:
- the second expansion valve 23 acts as a closed valve when the circuit 1 operates in the second mode and as an expansion valve in the variant of the second mode;
- the evaporator 9 and the heat exchanger 11 operate at substantially equivalent pressure levels;
- the first and third expansion valves, respectively 21 and 23, as well as the bidirectional expansion valve 19 respectively placed upstream of the evaporator 9, of the heat exchanger 11 and of the evaporator-condenser 7 (the bidirectional exchanger also being downstream of the evaporator and of the heat exchanger) make it possible to adjust the temperature of the evaporator 9 in order to limit if necessary the heat exchange, at the level of the exchanger 11 with the electric member. More particularly, it is possible to ensure that the battery (or the electric member if the latter is capable of doing so) absorbs a large part of the power or heat produced by the circuit 1.

More particularly, in the first variant of the third operating mode shown in FIG. 4a, said fluid passes through the evaporator-condenser 7 and the evaporator 9 which are arranged in parallel with one another.

Thus, the fluid intended to pass through the second branch 15 and then the first sub-branch 15a undergoes expansion by the first expansion valve 21 before circulating in the evaporator 9, while the fluid intended to pass through the third branch 17 undergoes expansion by the third expansion valve 25 before circulating in the evaporator-condenser 7. At the outlet of the evaporator-condenser 7, the refrigerant undergoes, if necessary, expansion by the bidirectional expansion valve 19.

Thereafter, the portions of refrigerant having circulated respectively through the evaporator 9 and the evaporator-condenser 7 meet upstream of the third valve V3 before circulating in the first branch 13 and leading into the reservoir R before said fluid is sucked back in by the compressor 3.

Thus, the air flow intended to lead into the passenger compartment is cooled by the evaporator 9 before being heated by the condenser 5.

More particularly, in the second variant of the third operating mode shown in FIG. 4b, said fluid passes through the heat exchanger 11 and the evaporator 9 which are arranged in parallel with one another.

Thus, the fluid intended to pass through the second branch 15 and then the first sub-branch 15a undergoes expansion by the first expansion valve 21 before circulating in the evaporator 9, while the fluid intended to pass through the second branch 15 and then the first sub-branch 15b undergoes expansion by the second expansion valve 23 before circulating in the heat exchanger 11.

Subsequently, the portions of refrigerant having circulated respectively through the evaporator 9 and the heat exchanger 11 meet upstream of the third valve V3 before circulating in the first branch 13 and leading into the reservoir R before said fluid is sucked back in by the compressor 3.

Thus, the air flow intended to lead into the passenger compartment is cooled by the evaporator 9 before being heated by the condenser 5.

More particularly, in the third variant of the third operating mode shown in FIG. 4c, said fluid passes through the evaporator 9, the evaporator-condenser 7 and the heat exchanger 11 which are arranged in parallel with one another.

Thus, the fluid intended to pass through the second branch 15 and then the first sub-branch 15a undergoes expansion by the first expansion valve 21 before circulating in the evaporator 9.

The fluid intended to pass through the second branch 15 and then the first sub-branch 15b undergoes expansion by the second expansion valve 23 before circulating in the heat exchanger 11.

The fluid intended to pass through the second branch 15 and then the first sub-branch 15b undergoes expansion by the second expansion valve 23 before circulating in the heat exchanger 11, while the fluid intended to pass through the third branch 17 undergoes expansion by the third expansion valve 25 before circulating in the evaporator-condenser 7. At the outlet of the evaporator-condenser 7, the refrigerant undergoes expansion by the bidirectional expansion valve 19.

Thereafter, the portions of refrigerant having circulated respectively through the evaporator 9, the heat exchanger 11 and the evaporator-condenser 7 meet upstream of the third valve V3 before circulating in the first branch 13 and leading into the reservoir R before said fluid is sucked back in by the compressor 3.

Thus, the air flow intended to lead into the passenger compartment is cooled by the evaporator 9 before being heated by the condenser 5.

FIG. 5, for its part, is a linear schematic representation when the circuit of FIG. 1 operates in a fourth operating mode, called "battery heating" mode.

In the fourth operating mode, said fluid successively passes through the condenser 5, the heat exchanger 11 and the evaporator-condenser 7. Specifically, these elements 5, 7 and 11 are arranged in series in the fourth operating mode.

The refrigerant is therefore compressed by the compressor 3; at the outlet of the compressor 3, the refrigerant is in a high-pressure gaseous state, then undergoes condensation carried out successively by the condenser 5. The refrigerant leaving the condenser 5 undergoes, if necessary, expansion carried out by the second expansion valve 23 before circulating in the heat exchanger 11.

Thereafter, the refrigerant undergoes expansion carried out by the bidirectional expansion valve 19 before circulating through the evaporator-condenser 7 and then the reservoir R before being sucked back in by the compressor 3.

The fourth operating mode has the function of heating the electric battery of the vehicle (or an electric member), but said mode can also have the function of recovering heat (or calories) from the electric member, by means of the heat exchanger 11. More particularly, there is recovery of heat (or calories) from the electric member if the evaporation temperature at the exchanger 11 is lower than the temperature of said member.

FIG. 6, for its part, is a linear schematic representation when the circuit of FIG. 1 operates in a fifth operating mode, known as the "rapid cooling of the battery or of the electric member" mode.

In the fifth operating mode, said fluid successively passes through the condenser 5, the evaporator-condenser 7 and the heat exchanger 11. Specifically, these elements 5, 7 and 11 are arranged in series in the fifth operating mode.

The refrigerant is therefore compressed by the compressor 3; at the outlet of the compressor 3, the refrigerant is in a high-pressure gaseous state, then undergoes condensation carried out successively by the condenser 5 and the evaporator-condenser 7. The refrigerant leaving the evaporator-condenser 7 undergoes expansion carried out by the second expansion valve 23 before circulating in the heat exchanger 11.

Thereafter, the refrigerant reaches the reservoir R before being sucked back in by the compressor 3.

The fifth operating mode has the function of cooling the electric battery of the vehicle when the latter undergoes rapid charging and is therefore subjected to significant and rapid heating. The latter mode can also be applied to an electric member which undergoes rapid heating due to intense use.

It will be noted that the cardinal number adjectives used to qualify or designate certain elements are only used by way of indication and do not imply any limitation on these elements.

The invention claimed is:

1. A thermal conditioning circuit for a hybrid or electric motor vehicle, in which a refrigerant is able to circulate, said circuit comprising:
   a compressor;
   a condenser;
   an evaporator-condenser;
   an evaporator; and
   a heat exchanger thermally coupled to an electric member, wherein the circuit is configured to operate at least in the following three modes, in which the refrigerant is able to circulate in series and successively:
      a first mode in which the refrigerant circulates through the condenser, then through the evaporator-condenser, and then through the evaporator,
      a second mode in which the refrigerant circulates through the condenser, then through the evaporator, and then through the evaporator-condenser, and
      a third mode, in which the evaporator is arranged in parallel with the heat exchanger and/or the evaporator-condenser, and in which the refrigerant circulates in series and successively through the condenser and then through at least two of evaporator, heat exchanger and the evaporator condenser arranged in parallel, and
   wherein the circuit further comprises:
      a first branch comprising the compressor and the condenser downstream of the compressor, a first valve and a reservoir, the reservoir being arranged upstream of the compressor and the valve being arranged upstream of the reservoir,
      a second branch comprising a second valve, the evaporator and the heat exchanger, and
      a third branch comprising the evaporator-condenser, said first, second and third branches being connected in parallel with one another,
      a fourth branch which connects the second branch to the third branch, the connection being made on the second branch upstream of the first and second expansion valves and the second valve of the second branch, the connection being made on the third branch between the bidirectional expansion valve and the evaporator-condenser, and
      a fifth branch which connects the third branch to the first branch, the connection on the third branch being made between the third expansion valve and the evaporator-condenser, the connection on the first branch being made between the reservoir and the first valve of the first branch.

2. The circuit as claimed in claim 1, configured so that the circuit operates in a fourth mode in which the refrigerant is able to circulate in series and successively through the condenser, the heat exchanger and the evaporator-condenser.

3. The circuit as claimed in claim 1, configured to allow a reversal of the direction of circulation of the refrigerant in the evaporator-condenser at least between the first and second operating modes of said circuit.

4. The circuit as claimed in claim 1, configured so that the circuit operates in a fifth mode in which the refrigerant is able to circulate in series and successively through the condenser, the evaporator-condenser and the heat exchanger.

5. The circuit as claimed in claim 1, further comprising: a bidirectional expansion valve which allows the refrigerant passing through it or having passed through the evaporator-condenser to undergo expansion, whether the evaporator-condenser operates as an evaporator or as a condenser.

6. The circuit as claimed in claim 1, further comprising: at least three expansion valves including:
 a first expansion valve located directly upstream of the evaporator,
 a second expansion valve located directly upstream of the heat exchanger, and
 a third expansion valve located directly upstream of the evaporator-condenser when the latter operates as a condenser.

7. The circuit as claimed in claim 1, wherein the second branch comprises two sub-branches connected in parallel with one another, one comprising the evaporator and the other the heat exchanger.

8. A thermal conditioning circuit for a hybrid or electric motor vehicle, in which a refrigerant is able to circulate, said circuit comprising:
 a compressor;
 a condenser;
 an evaporator-condenser;
 an evaporator; and
 a heat exchanger thermally coupled to a vehicle electric battery,
 wherein the circuit is configured to operate in the following modes:
  a first mode in which the refrigerant circulates in series and successively through the condenser, then through the evaporator-condenser, and then through the evaporator, to cool air configured to blow in a passenger compartment of the motor vehicle,
  a second mode in which the refrigerant circulates in series and successively through the condenser, then through the evaporator, and then through the evaporator-condenser, to heat air configured to blow in the passenger compartment of the motor vehicle, and
  a third mode, in which the evaporator is arranged in parallel with the heat exchanger and the evaporator-condenser, and in which the refrigerant circulates in series and successively through the condenser and then through at least two of evaporator, heat exchanger and the evaporator condenser arranged in parallel,
 the third mode being for dehumidifying air configured for the passenger compartment and to cool the electric battery when said heat exchanger is traversed by the refrigerant, and
wherein the circuit further comprises:
 a first branch comprising the compressor and the condenser downstream of the compressor, a first valve and a reservoir, the reservoir being arranged upstream of the compressor and the valve being arranged upstream of the reservoir,
 a second branch comprising a second valve, the evaporator and the heat exchanger, and
 a third branch comprising the evaporator-condenser, said first, second and third branches being connected in parallel with one another,
 a fourth branch which connects the second branch to the third branch, the connection being made on the second branch upstream of the first and second expansion valves and the second valve of the second branch, the connection being made on the third branch between the bidirectional expansion valve and the evaporator-condenser, and
 a fifth branch which connects the third branch to the first branch, the connection on the third branch being made between the third expansion valve and the evaporator-condenser, the connection on the first branch being made between the reservoir and the first valve of the first branch.

* * * * *